United States Patent [19]

Yoshikawa

[11] 4,143,745

[45] Mar. 13, 1979

[54] HOLDER APPARATUS FOR PULLING-UP WIRE IN CENTER PULL TYPE CALIPER BRAKE

[75] Inventor: Kunihiko Yoshikawa, Soka, Japan

[73] Assignee: Kabushiki Kaisha Yoshikawa Seisakusho, Yashio, Japan

[21] Appl. No.: 839,737

[22] Filed: Oct. 5, 1977

[30] Foreign Application Priority Data

May 27, 1977 [JP] Japan ........................ 52-67610[U]

[51] Int. Cl.² .................................................. B62L 1/12
[52] U.S. Cl. ................................... 188/24; 74/501 R
[58] Field of Search ..... 74/242.1, 242.1 R, 242.1 TA, 74/242.15 B, 517, 501 R, 501.5; 114/215; 188/24

[56] References Cited

U.S. PATENT DOCUMENTS 4,026,390  5/1977  Yoshigai ........................... 188/24

FOREIGN PATENT DOCUMENTS 302510  12/1963  Netherlands ........................ 188/24

Primary Examiner—Duane A. Reger
Attorney, Agent, or Firm—Haseltine, Lake & Waters

[57] ABSTRACT

A holder for pulling-up wire in a center pull type caliper brake for a bicycle. The holder has an upper portion with a wire screw and a hook portion at the lower portion for hooking a pulling-up wire. A pair of finger members projecting from the holder member on both sides of the hook portion and a guide member serve to pull up wire from the hook portion.

2 Claims, 5 Drawing Figures

HOLDER APPARATUS FOR PULLING-UP WIRE IN CENTER PULL TYPE CALIPER BRAKE

BACKGROUND OF THE INVENTION

The present invention relates to a holder for pulling-up wire in a center pull type caliper brake for a bicycle.

It has been usual hitherto with this kind of holder that, in view of the fact that it is difficult to hook the pulling-up wire under its tightened condition on the holder member, that the holder member be provided with separate metal fittings such as a quick release means or the like. Accordingly, the pulling-up wire is previously fastened under its loosened condition with the fittings and is then hooked on the holding member under its tightened condition by pulling up the fittings. The use of such separate fittings as, a quick release one, however, have disadvantages, for example, that the holder becomes complicated in construction and high in price.

SUMMARY OF THE INVENTION

The invention has for its main object a holder free from prior disadvantages.

Another object is to provide an inexpensive holder which is simple in construction.

Other objects and advantages of the invention will be better understood with respect to accompanying specification, claims and drawings.

IN THE DRAWINGS

PREFERRED EMBODIMENT OF THE INVENTION

Figure 1:
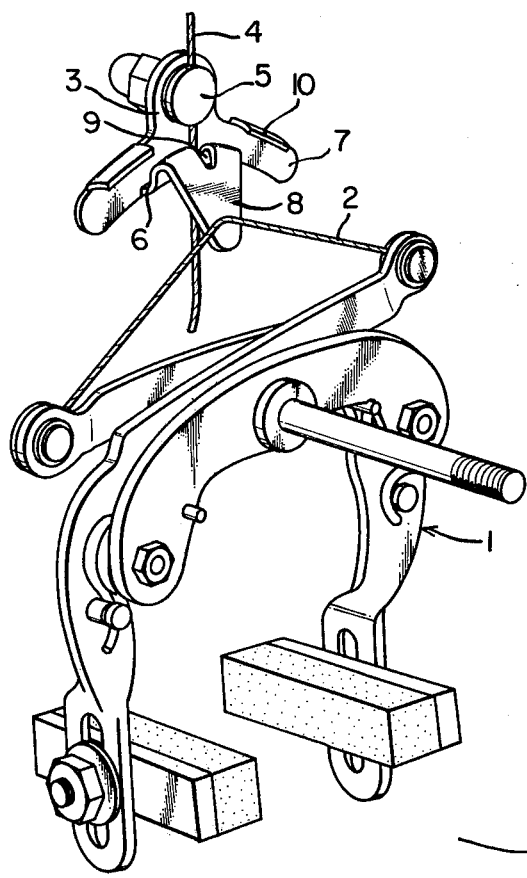
FIG. 1 is a perspective view of one embodiment of the invention.

According to the drawings, a center pull type caliper brake 1, a pulling-up wire 2, a holder member 3 for the pulling-up wire 2 is provided at its upper portion with a wire screw 5 for fastening an operation wire 4 and at its lower portion with a hook portion 6 for hooking the pulling-up wire 2. Furthermore, according to the invention, the foregoing holder member 3 is provided with a pair of finger applying members 7,7 projecting therefrom on both sides of the hooking portion 6 and also with a guide member 8 for pulling-up wire 2 extending downward from the engaging portion 6.

Figure 4:
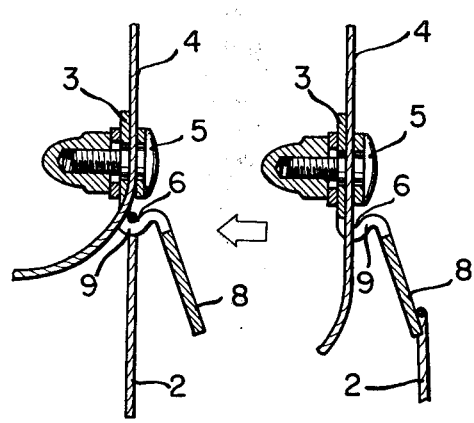
FIG. 4 is a sectional view of a section of the invention under an engaged condition.
Figure 5:
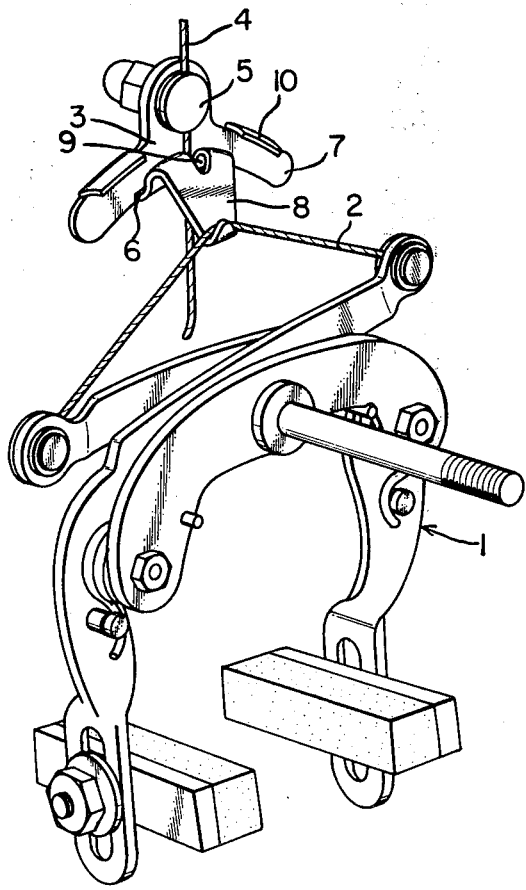
FIG. 5 is a perspective view of a modification of the invention.

A modified example of the invention is shown in FIG. 5. The guide member 8 is provided at its front end with a temporary hook member 8a so that the pulling-up wire 2 can be hooked on the same under its loosened condition. The hook portion 6 is provided with a hole 9 for passing therethrough an end portion of the operation wire 4, so that the end portion of the operation wire 4 passing through the opening 9 is pushed to deviate rearward by the pulling-up wire 2 as the pulling-up wire 2 is held in engagement with the hook portion 6 as shown in FIG. 4. A finger applying flange 10 is provided on each finger applying member 7.

Figure 2:
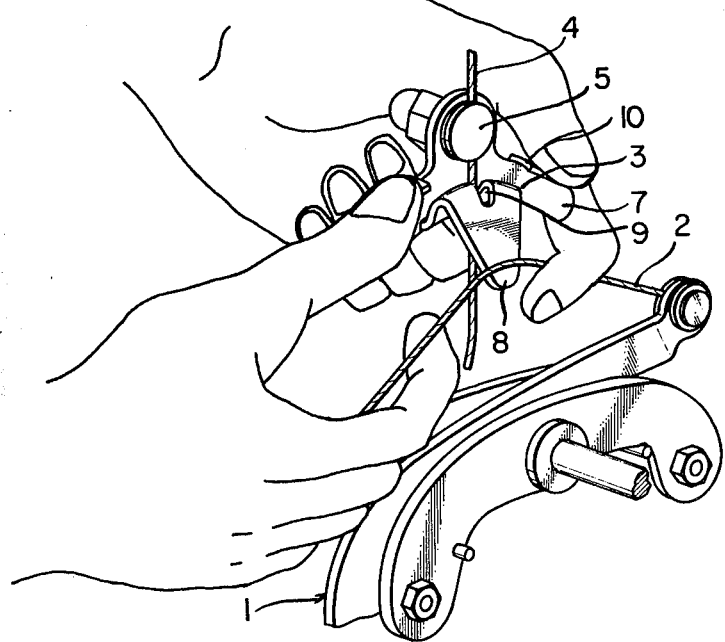
FIGS. 2 and 3 are perspective views of the invention under operating conditions.
Figure 3:
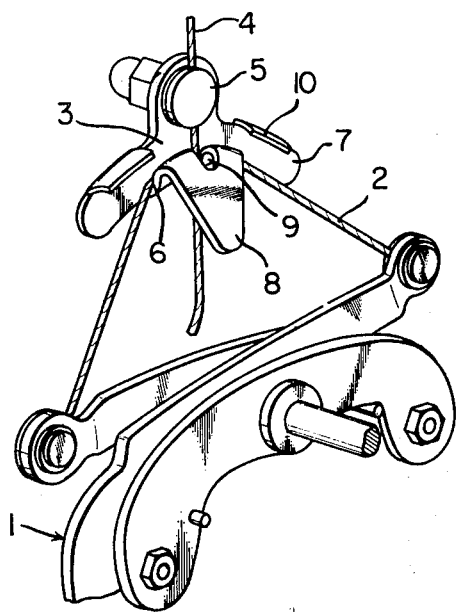

The operation of the holder will now be explained as follows:

First, the holder member 3 is positioned at such a level where the pulling-up wire 2 can be brought into contact under its loosened condition with the guide member 8 of the holder member 3 as shown in FIG. 1. In this case, the wire 2 is kept stable in this contact condition if the temporary hook member 8a is provided as mentioned before, and this arrangement is shown clearly in FIG. 5. If fingers are applied to the finger applying members 7,7 and the pulling-up wire 2 as shown in FIG. 2 and the wire 2 is pulled up by fingers along on the guide member 8 until it is hooked on the hooking portion 6, the wire 2 is easily brought into engagement with the hook portion 6 under its tightened condition as shown in FIG. 3.

Thus, according to this invention, the holder member is provided with a pair of finger applying members projecting therefrom on both sides of the hook portion. Also with the guide member projecting downward from the hook portion, engagement of the pulling-up wire under its tightened condition with the hook portion, can be easily carried out simply by applying the fingers. Thus, the hooking operation can be remarkably facilitated, and the holder can be produced economically because such a fitting as a quick release one or the like, is not required. In the case where the guide member is provided at its front end with the temporary hook member, the pulling-up operation of the wire can become easier.

Many modifications and variations of the present invention are possible in light of the above teachings. It is, therefore, to be understood that within the scope of the appended claims, the invention may be practiced otherwise than as particularly described.

What I claim is:

1. A holder apparatus for pulling-up a wire in a center pull type caliper brake where a holder member is provided at its upper portion with a wire screw for fastening an operation wire and at its lower portion with a hook portion for hooking a pulling-up wire, wherein: the holder member is provided with a pair of finger members projecting at the rear and on both sides of the hook portion, said hook portion being defined by a groove formed by respective front and rear side wall members, and with a guide member disposed at the front side of said hook portion for pulling-up a wire projecting downwardly from the hook portion.

2. A holder apparatus as claimed in claim 1, wherein: the guide member is provided at its front end with a temporary hook member for the pulling-up wire, said temporary hook member being defined by a lower end of said guide member bent upwardly.

* * * * *